(12) United States Patent
Lu

(10) Patent No.: US 7,748,126 B2
(45) Date of Patent: Jul. 6, 2010

(54) LASER STRAIGHT LINER

(76) Inventor: Jianhong Lu, Room 301, Unit A, Building No. 5, Wenheng Garden, Changzhou (CN)

( * ) Notice: Subject to any disclaimer, the term of this patent is extended or adjusted under 35 U.S.C. 154(b) by 0 days.

(21) Appl. No.: 11/873,761

(22) Filed: Oct. 17, 2007

(65) Prior Publication Data
US 2009/0100691 A1    Apr. 23, 2009

(51) Int. Cl.
*G01C 15/00* (2006.01)
(52) U.S. Cl. .................. 33/286; 33/281; 33/DIG. 21
(58) Field of Classification Search .......... 33/227, 33/276, 278–286, DIG. 21
See application file for complete search history.

(56) References Cited

U.S. PATENT DOCUMENTS

| | | | |
|---|---|---|---|
| 5,159,760 A * | 11/1992 | Spiegel et al. ............ 33/227 |
| 5,287,365 A * | 2/1994 | Nielsen et al. ............ 356/138 |
| 6,011,613 A * | 1/2000 | Ohtomo et al. ............ 356/4.08 |
| 6,452,668 B1 * | 9/2002 | Pratt ............ 356/141.4 |
| 6,453,569 B1 * | 9/2002 | Kumagai et al. ............ 33/281 |
| D474,985 S * | 5/2003 | Cooper et al. ............ D10/69 |
| 7,040,030 B2 * | 5/2006 | Sawaguchi ............ 33/290 |
| 7,059,057 B2 * | 6/2006 | Raskin et al. ............ 33/286 |
| 7,099,000 B2 * | 8/2006 | Connolly ............ 356/139.1 |
| 7,134,212 B2 * | 11/2006 | Marshall et al. ............ 33/286 |
| 7,392,591 B2 * | 7/2008 | Milligan et al. ............ 33/286 |
| 2005/0198845 A1 * | 9/2005 | Robinson ............ 33/227 |
| 2005/0268474 A1 * | 12/2005 | Liao ............ 33/285 |
| 2007/0028470 A1 * | 2/2007 | Nash et al. ............ 33/286 |
| 2007/0044332 A1 * | 3/2007 | Yung et al. ............ 33/286 |
| 2007/0109808 A1 * | 5/2007 | Hobden et al. ............ 362/551 |

* cited by examiner

*Primary Examiner*—R. A. Smith
(74) *Attorney, Agent, or Firm*—Boyle Fredrickson, S.C.

(57) ABSTRACT

The utility model relates to a kind of laser straight liner, including a foundation and a base, wherein said foundation is provided with batteries and said base is provided with at least one laser projection module. Said base and said foundation are connected in the way that is 360 degrees rotatable. One side of said foundation that faces said base is provided with the anode and cathode conduction rings that can connect batteries, and one side of said base that faces said foundation is provided with two contact pieces that can connect various laser projection modules and also can touch the anode and cathode conduction rings, thus realizing the conduction-wire-free connection between said laser projection modules and said batteries. This utility model makes said laser projection modules freely rotatable on said foundation, and thus the rotated angle during marking can be accurately controlled, ingenious and reasonable in design and convenient in operation. The lower-end transparent shell of cavity is provided with a cross scale, and the crossing point of said cross scale can be superposed with the intersection projection of the counter-extension lines of the laser beams emitted by various said laser projection modules, thus ensuring a accurate positioning.

19 Claims, 7 Drawing Sheets

LASER STRAIGHT LINER

FIELD OF THE TECHNOLOGY

The present utility model relates to a laser straight liner.

BACKGROUND ART

Laser Straight Liner is usually adapted for use in the field of construction and decoration layout, mainly including a foundation and a base, wherein said base is provided with laser projection modules. In practical use, these existing Laser Straight Liners normally suffer from some certain disadvantages that the laser beam emitted by the instrument is permanently fixed relative to the instrument itself, and in order to rotate the angle during marking, user must turn the whole instrument. In this way the position of the straight liner may easily suffer from deviation, and thus the marking error occurs. Moreover, those straight liners are not convenient for user to get the desired rotated angle.

DESCRIPTION OF THE UTILITY MODEL

It is the object of this utility model to introduce a Laser Straight Liner that can provide accurate rotary marking without the need of turning the whole instrument. The technical proposal for realizing the intention of this utility model is described as follows:

A Laser Straight Liner includes a foundation and a base, wherein there are batteries provided in said foundation and there is at least one laser projection module installed on said base. Said base and said foundation are connected in the way that is 360 degrees rotatable, and there are anode and cathode conduction rings provided on one side of said foundation that faces said base, and there are two contact pieces provided on one side of said base that faces said foundation, wherein said two contact pieces can be connected with various laser projection modules and also can touch said anode and cathode conduction rings, to realize the conducting-wire-free connection between said laser projection modules and said batteries.

Said foundation and said base of said Laser Straight Liner are both provided with columnar cavities in the middle, wherein the upper-end shell of said base's cavity and the lower-end shell of said foundation's cavity are both made of transparent materials.

Two to five laser projection modules are provided on said base of said Laser Straight Liner.

Said cavity's lower-end shell of said Laser Straight Liner's foundation is marked with cross scale, and the crossing point of said cross scale can be superposed with the intersection projection of the counter-extension line of the laser beams emitted by various said laser projection modules.

Said foundation of said laser straight liner is provided with scale in outer surface.

This utility model can come to some positive effects as follows:

1. Said base of this utility mode can make said laser projection modules 360 degrees rotatable on said foundation, and said laser projection modules and said batteries can be connected through the touch between said contact pieces and said anode, cathode conduction rings, thus to realize the conduction-wire-free connection said laser projection modules and said batteries. It features compact construction, ingenious and reasonable design and convenient operation. Said scale on the outer surface of said foundation can ensure accurately controlling the rotated angle during marking.

2. In this utility model, there is columnar cavity in the middle, and the upper-end shell and the lower-end shell of said cavity are made of transparent materials; moreover, said transparent lower-end shell is provided with cross scale, wherein the crossing point of said cross scale can be superposed with the intersection projection of the counter-extension line of the laser beams emitted by various said laser projection modules, thus to ensure a accurate positioning.

DESCRIPTION OF THE PREFERRED EMBODIMENT

Embodiment 1

Figure 1:
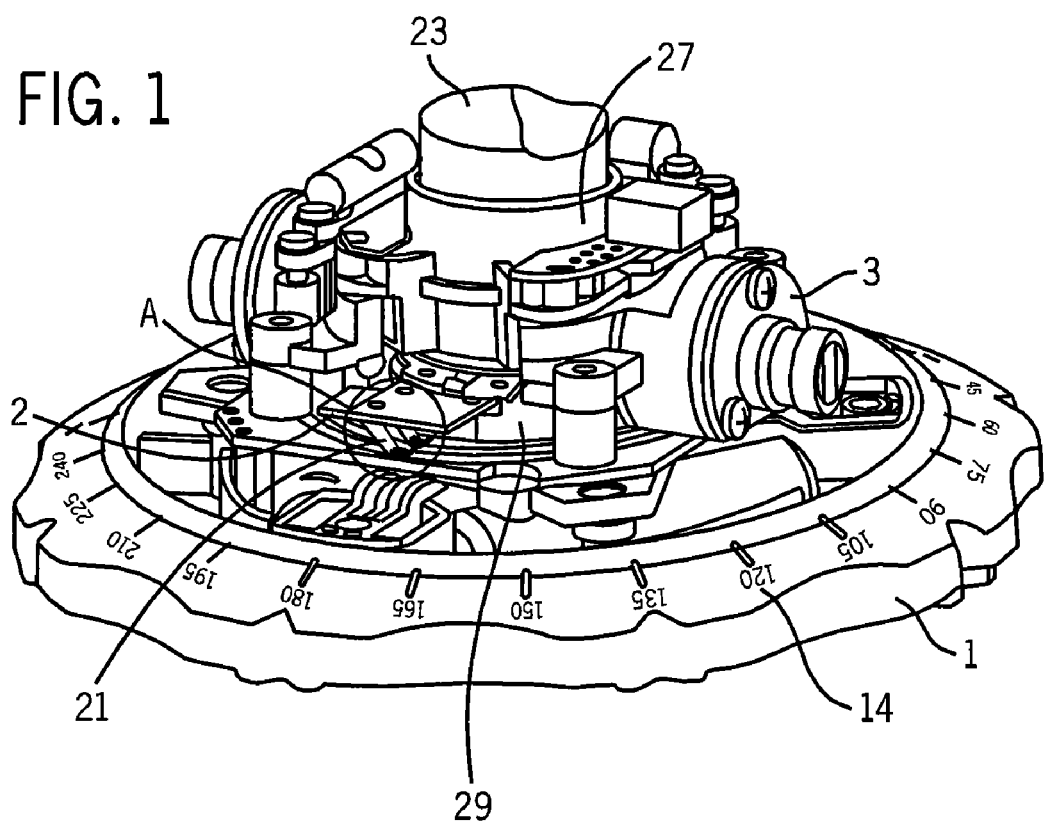
FIG. 1 is a schematic view showing the constriction of this utility model.
Figure 2:
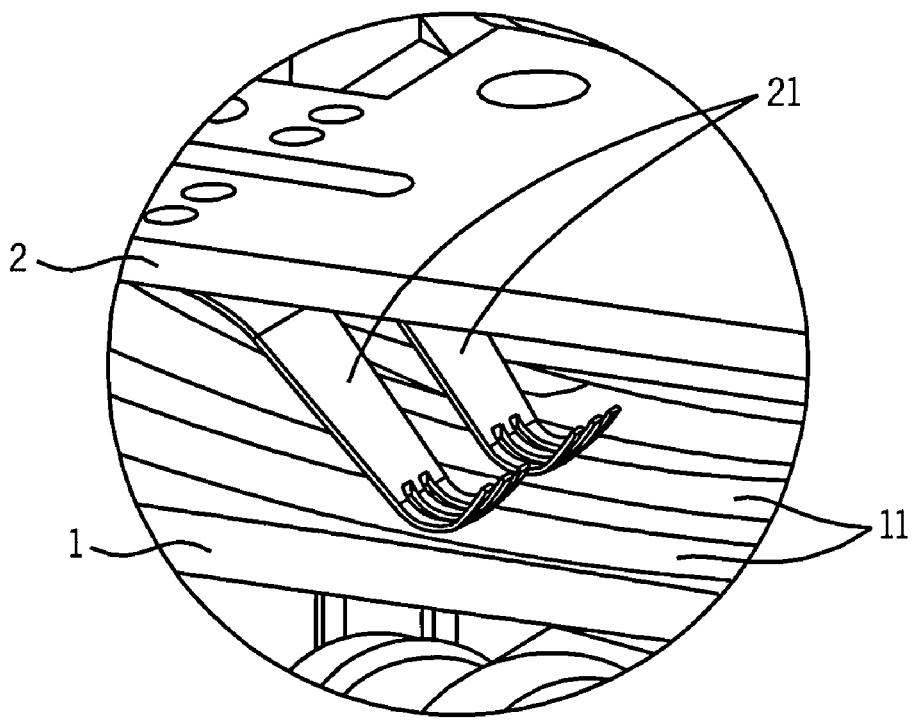
FIG. 2 is a sectional enlarged view showing the 1A of said
Figure 3:
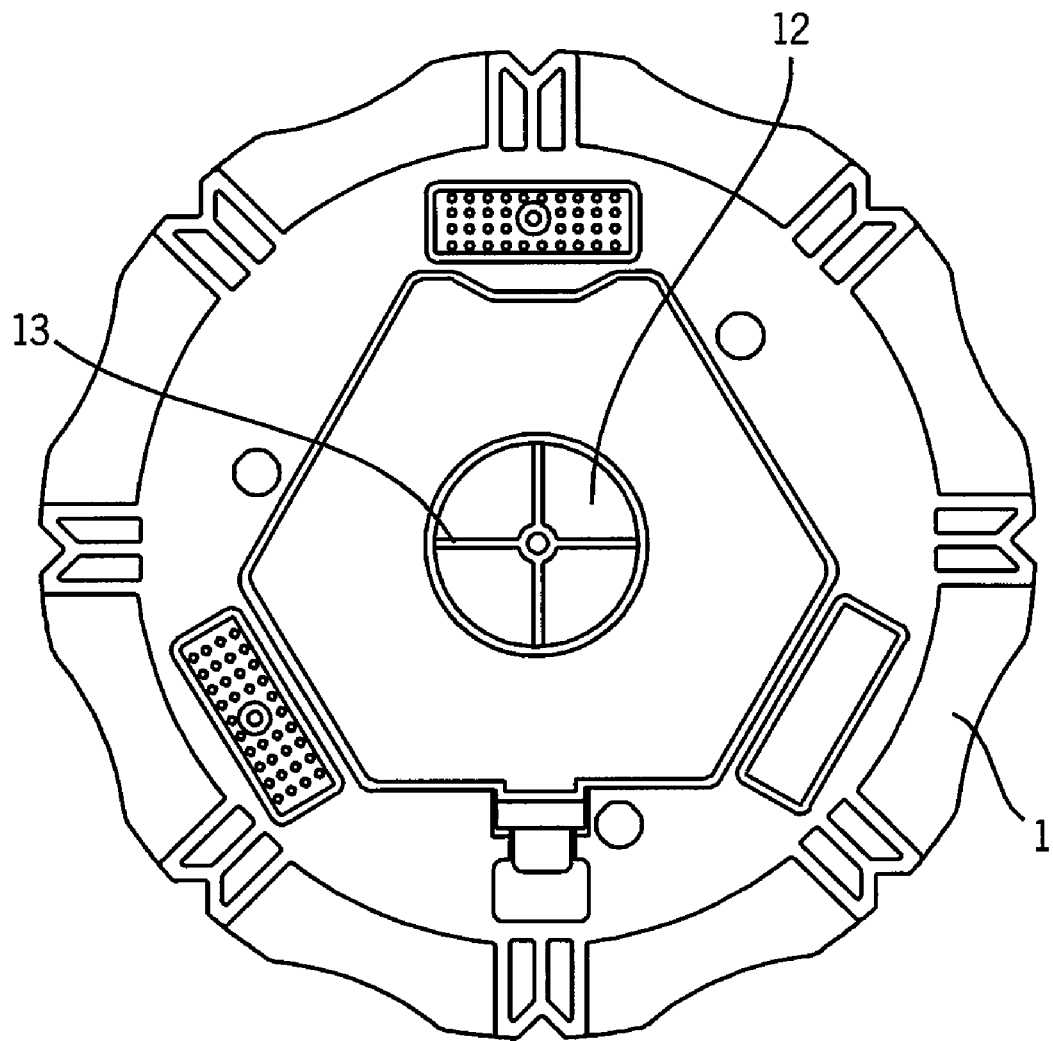
FIG. 3 is an upward view of this utility model.

As shown in the FIG. 1 and FIG. 2, this utility model involves a foundation 1 and a base 2, wherein there are batteries provided in said foundation 1 and laser projection modules 3 provided on said base 2, generally including three laser projection modules 3 that are evenly distributed thereon. Said base 2 is connected onto said foundation 1 in the way that is 360 degrees freely rotatable. Said laser projection modules 3 need powering by said batteries. On one side of said foundation 1 that faces said base 2, there are anode and cathode conduction rings 11 that can connect the anode and cathode of said batteries respectively. On one side of said base 2 that faces said foundation 1, there are two contact pieces 21 that can electrically connect said various laser projection modules 3 and meantime can touch the anode and cathode conduction rings respectively. During the rotation of said base 2, said contact pieces 21 can separately slide along their respective conduction rings 11, thus ensure that said various laser projection modules 3 on said base 2 can electrically connect said batteries in said foundation 1 all the time, thus to realize the conducting-wire-free connection between said laser projection modules 3 and said batteries.

Both said foundation 1 and said base 2 have one columnar cavity in the middle, wherein both the upper-end shell 22 of said cavity of said base 2 and the lower-end shell 12 of said cavity of said foundation 1 are made from transparent materials. Moreover, there are cross scale 13 marked on said lower-end shell 12 of said cavity of said foundation 1, and the crossing point of said cross scale 13 can be superposed with the intersection projection of the counter-extension lines of the laser beams emitted by said various laser projection modules 3. There is scale 14 provided on the outer surface of said base 1.

Figure 4:
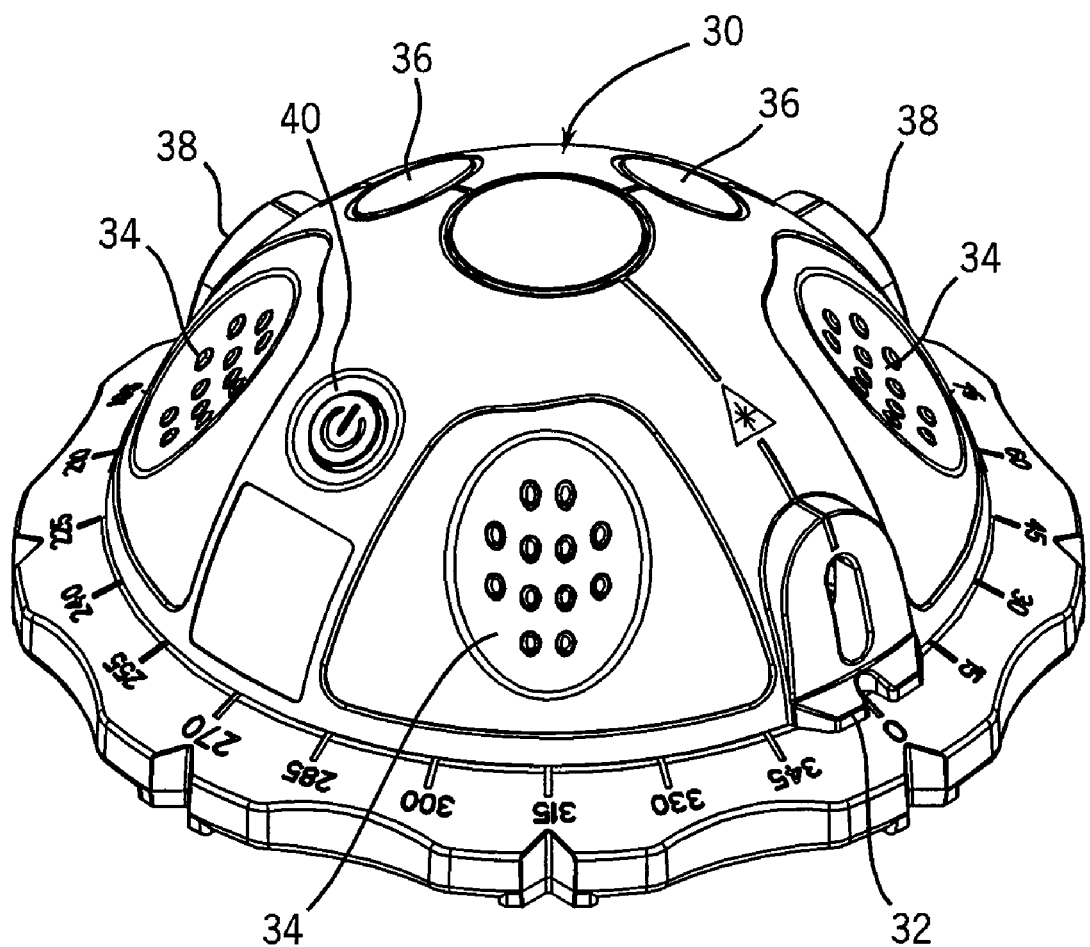
FIG. 4 is a view showing a fully assembled version of the rotary laser marking device of the present invention.
Figure 5:
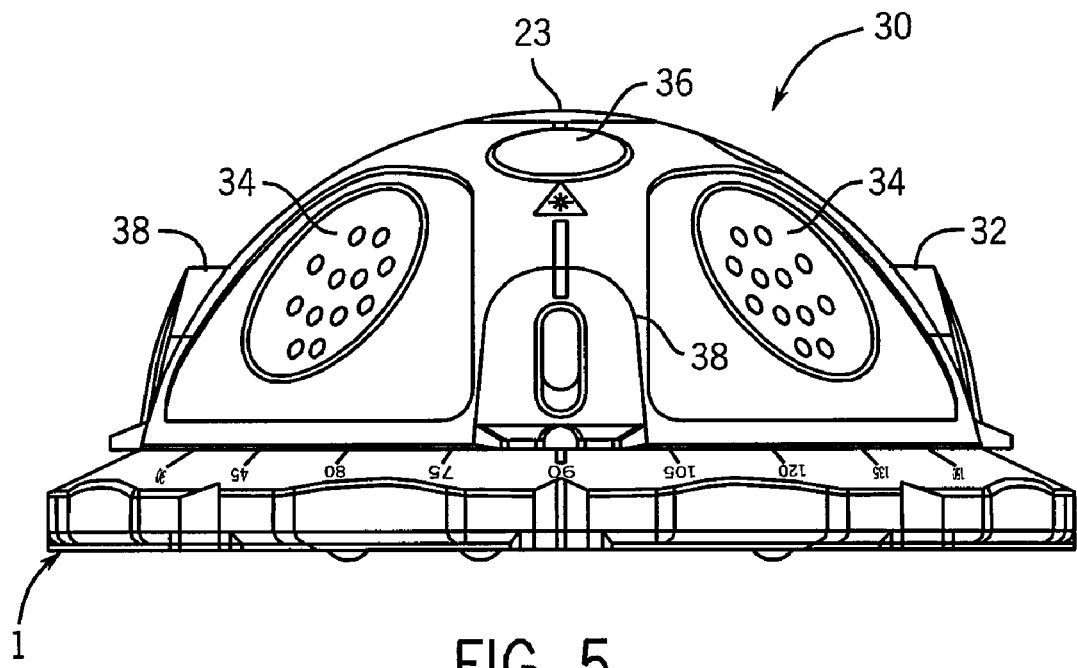
FIGS. 5-8 show side elevation views of the rotary laser marking device of the present invention.
Figure 6:
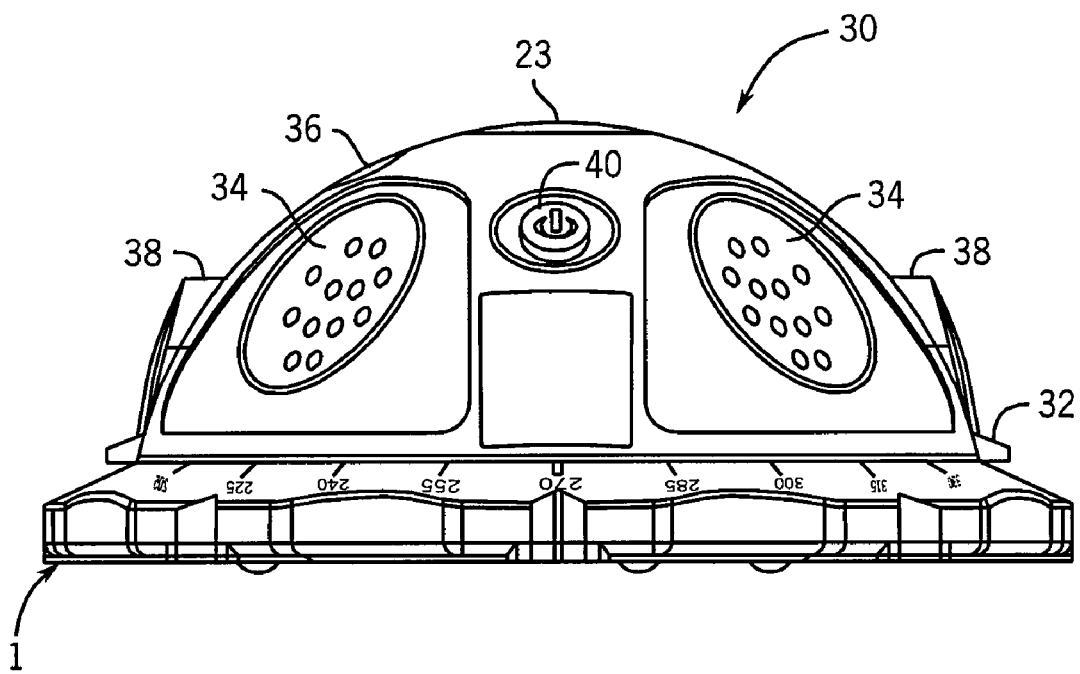
Figure 7:
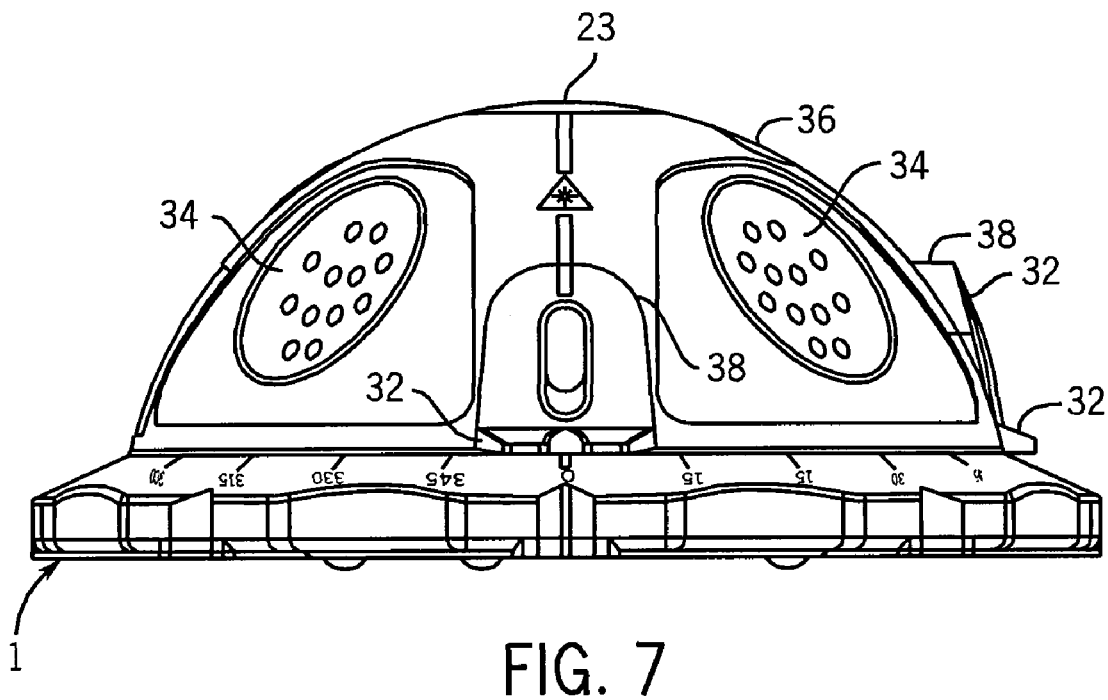
Figure 8:
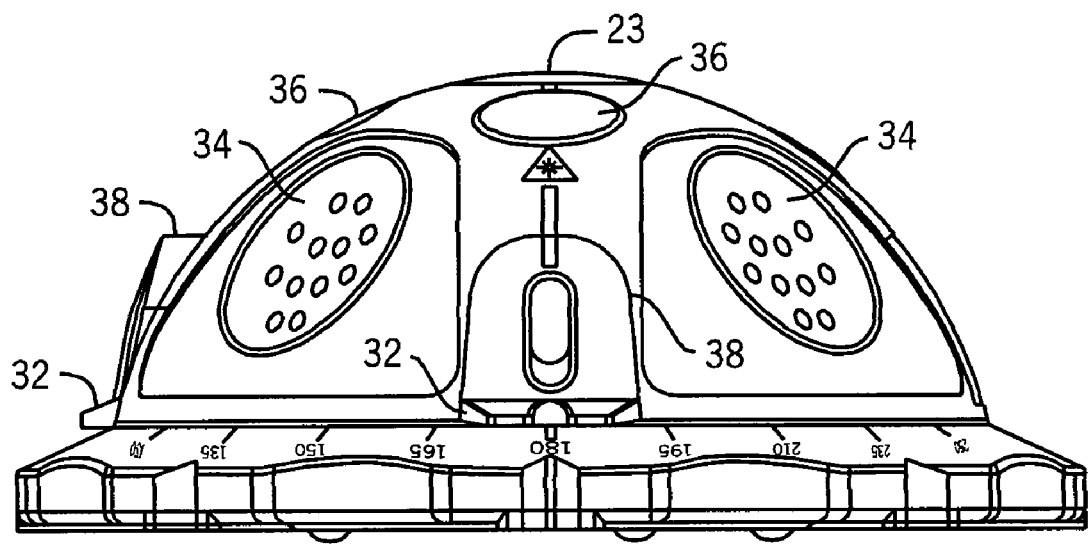

New drawing FIG. 4 shows a fully assembled version of the rotary laser marking device of the present invention. As shown in FIG. 4, the rotary laser marking device includes an upper shell 30 which overlies the base 2. The base 2 includes a transparent actuator 23, which enables a user to view the cross scale 13 from above. Transparent actuator 23 can be depressed in order to extend a series of feet 31, shown in FIG. 9, which include an adhesive material that it enables the rotary laser marking device to be secured to a surface such as a wall or floor. The upper shell 30 also includes a series of markers 32, each of which defines a recess that can be aligned with one of the angle indicators provided on scale 14, to provide an indication of the angle of upper shell 30 relative to foundation 1.

Upper shell 30 also includes a series of finger grip recesses 34 that can be gripped by a user to facilitate rotation of upper shell 30 relative to foundation 1. A pair of windows 36 are also provided in upper shell 30, to provide visibility of the vials that are carried by base 2. Upper shell 30 also includes a series of protrusions 38, each of which defines an opening aligned with one of the projection modules 3, to enable a laser beam from the projection modules 3 to pass to the exterior of upper shell 30. A power switch 40 is provided on base 2, and projects through an opening formed in upper shell 30. Power switch 40 selectively provides power from batteries housed within foundation 1 to the projection modules 3.

The markers 32 are provided in the locations of protrusions 38, and are in alignment with the projection modules 3 so that the recess in each marker 32 corresponds to the location from which the laser beam is emitted through the opening in the protrusion 38 at each marker 32.

New drawing FIGS. 5-8 show the side elevation views of the rotary laser marking device of the present invention.

Figure 9:
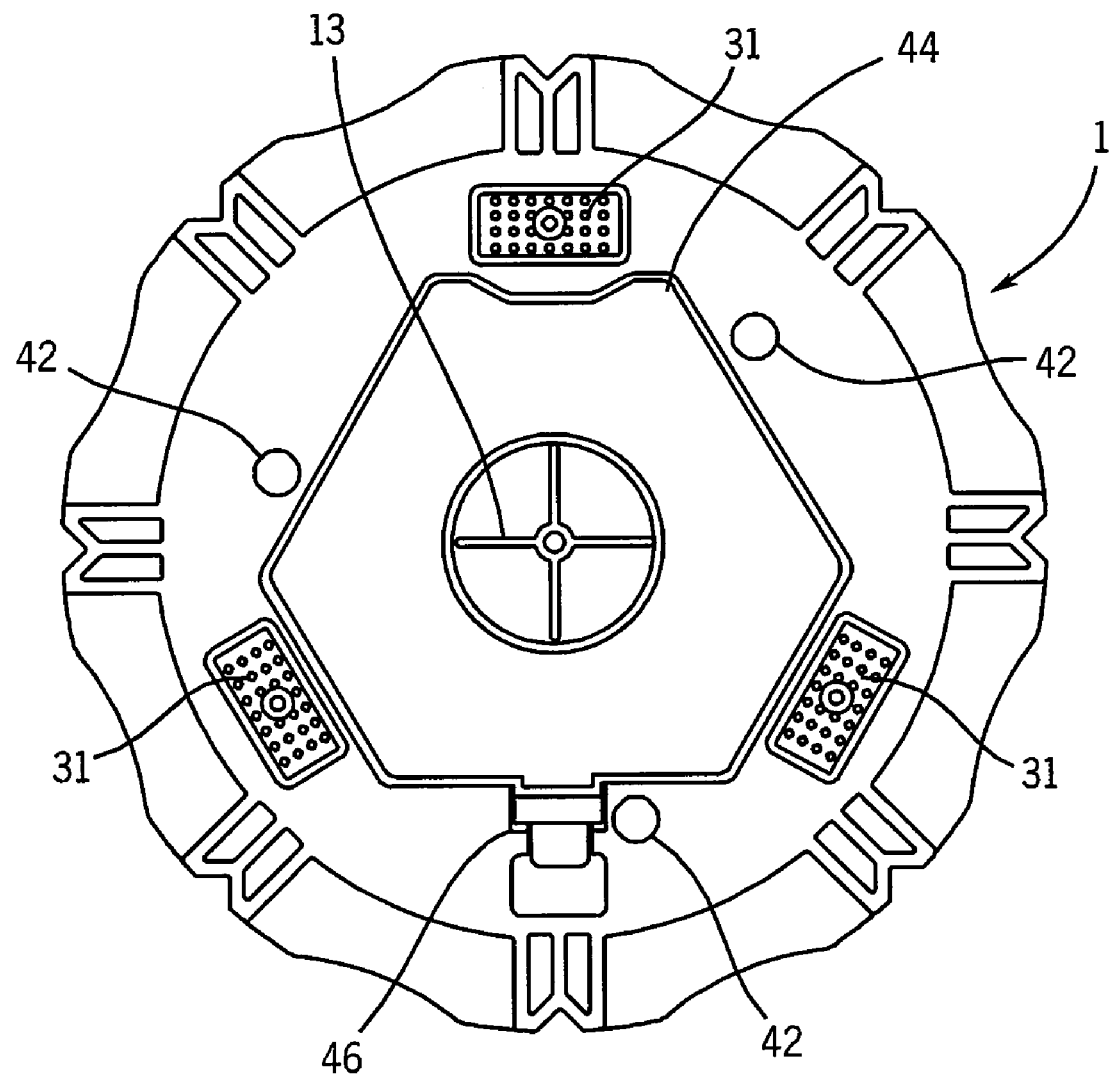
FIG. 9 is a view illustrating the underside of the rotary laser marking device of the present invention.

New drawing FIG. 9 illustrates the underside of the rotary laser marking device of the present invention. The foundation 1 includes a series of bumps or protrusions 42 that are adapted to engage a surface. When the feet 31 are extended by depression of actuator 23, the feet 31 extend beyond protrusions 42 so as to secure the rotary laser marking device to the surface. The underside of the foundation 1 also includes a removable battery cover 44, which includes a central opening within which the window providing the cross scale 13 is located. The battery cover 44 includes a conventional latch 46, which enables the battery cover to be selectively removed from and engaged with the foundation 1. The battery cover 44 functions to cover a battery cavity within which a series of batteries are received. The batteries are thus carried by foundation 1, and battery cover 44 provides quick and easy access to the batteries for replacement when needed.

Figure 10:
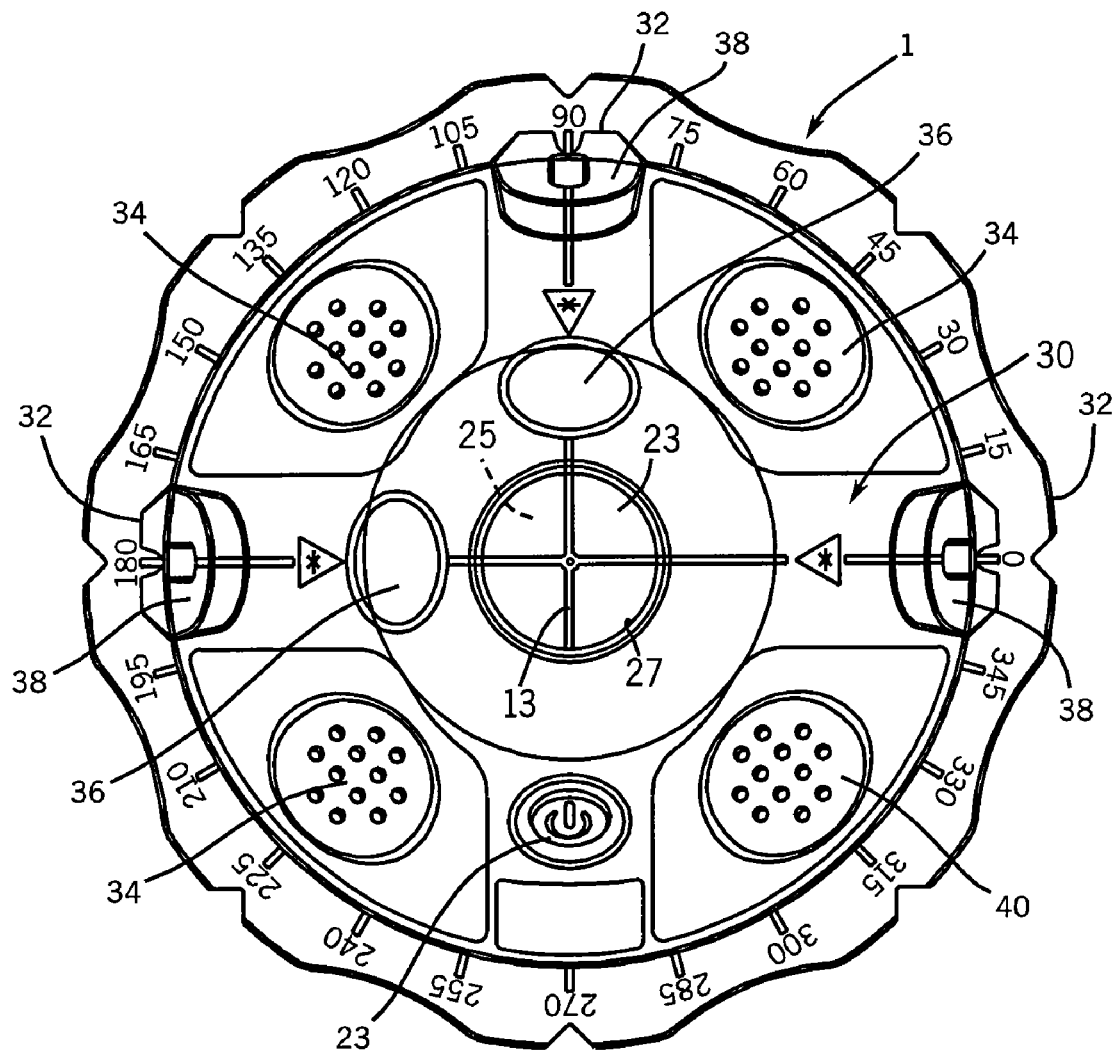
FIG. 10 is a top plan view of the rotary laser marking device of the present invention.

New drawing FIG. 10 illustrates a top plan view of the rotary laser marking device of the present invention, in which the parts and components that have been described previously are illustrated. As referenced above, the actuator 23 is made of transparent material which allows for the cross-scale 13 to he seen through the actuator 23 and the columnar cavity 25 defined by an elongated annular wall 27 formed in the base and an elongated annular wall 29 formed in the foundation 1.

I claim:

1. A laser level, comprising:
   a foundation (1) with at least one battery provided therein,
   a base (2) with at least one laser projection module (3) mounted thereon,
   wherein said base (2) and said foundation (1) are connected in a way that allows for 360 degrees rotation of said base relative to said foundation, and wherein one side of said foundation (1) that faces said base (2) is provided with anode and cathode conduction rings (11) that are connected to said battery, and wherein one side of said base (2) that faces said foundation (1) is provided with two contact pieces (21) that connect to said at least one laser projection module (3) and that connect to the anode and cathode conduction rings (11) to provide a conduction-wire-free connection between said laser projection modules (3) and said batteries; and
   said laser level further including a columnar cavity in the middle of both said foundation (1) and said base (2), wherein an upper-end shell (22) of said cavity for said base (2) and a lower-end shell (12) of said cavity for said foundation (1) are both made of transparent materials.

2. The laser level of claim 1, wherein the at least one laser projection module includes at least two laser projection modules.

3. The laser level of claim 1, further including a cross scale (13) marked on said lower-end shell (12) of said foundation (1), wherein the crossing point of said cross scale (13) can be superposed with the intersection projection of the counter-extension line of the laser beams emitted by said at least one laser projection module (3).

4. The laser level of claim 1, further including a scale (14) marked on the outer surface of said foundation (1).

5. A laser level device comprising:
   a foundation;
   a base rotatably mounted to the foundation in a manner that permits 360 degrees of rotation of the base about an axis of rotation;
   a laser projection module mounted to the base and adapted to emit at least one laser beam;
   a cover mounted to the base and rotatable therewith; and
   an elongated cavity providing a line of sight through the foundation, the base, and the cover, wherein the elongated cavity is coincident with the axis of rotation.

6. The device of claim 5 wherein the elongated cavity includes a first transparent surface formed in the foundation and a second transparent surface formed in the base.

7. The device of claim 6 further comprising an actuator disposed within the elongated cavity, and wherein a top surface of the actuator forms the second transparent surface.

8. The device of claim 7 further comprising at least one foot formed on a bottom surface of the foundation, and wherein the at least one foot is movable away from the bottom surface of the foundation upon depression of the actuator into the elongated cavity.

9. The device of claim 8 further comprising adhesive affixed to the at least one foot.

10. The device of claim 6 further comprising a cross scale on the first transparent surface.

11. The device of claim 5 wherein the foundation includes a pair of conductive rings adapted to be electrically coupled to a power source contained in the foundation and wherein the base includes a pair of conductive tabs adapted to slide along the pair of rings, wherein the conductive tabs conduct electrical power from the conductive rings to the laser projection module.

12. The device of claim 11 wherein the power source includes at least one battery.

13. The device of claim 5 further comprising gripping elements mounted to an exterior surface of the cover.

14. The device of claim 5 further comprising at least one bubble vial supported by the base, and wherein the cover includes at least one window aligned with the at least one bubble vial to allow visual inspection of the at least one bubble vial.

15. The device of claim 5 wherein the laser projection module is configured to emit a first laser beam and a second laser beam that is emitted along an axis perpendicular to that of the first laser beam.

16. The device of claim 15 further comprising first and second openings formed in the cover and adapted to allow emission of the first and the second laser beams, respectively, through the cover.

17. The device of claim 16 further comprising markings formed on an exterior surface of the cover, the markings aligned with the first and the second openings such that the markings are co-aligned with the first and second laser beams when said beams are emitted by the laser projection module.

18. The device of claim 5 further comprising a power button extending from the base through the cover and adapted to selectively power the laser projection module when depressed.

19. A laser level device, comprising:
- a foundation with at least one battery provided therein,
- a base with at least one laser projection module mounted thereon, wherein said base and said foundation are connected in the way that allows for 360 degrees of rotation of said base relative to said foundation, and wherein one side of said foundation that faces said base is provided with anode and cathode conduction rings that are connected to said battery, and wherein one side of said base that faces said foundation is provided with two contact pieces that connect to said at least one laser projection module and that contact the anode and cathode conduction rings to provide a conduction-wire-free connection between said laser projection modules and said battery; and a cross scale marked on said foundation, wherein the crossing point of said cross scale can be superposed with the intersection projection of the counter-extension line of the laser beams emitted by said at least one laser projection module.

* * * * *